(12) United States Patent
Chen

(10) Patent No.: US 9,057,890 B2
(45) Date of Patent: Jun. 16, 2015

(54) STRUCTURE OF DIAMOND-EMBEDDED EARPIECE AND EYEGLASS AND DIAMOND-EMBEDDING METHOD THEREOF

(75) Inventor: Shousong Chen, Zhejiang (CN)

(73) Assignee: Wenzhou Bada Optical Co., Ltd., Zhejiang (CN)

( * ) Notice: Subject to any disclaimer, the term of this patent is extended or adjusted under 35 U.S.C. 154(b) by 10 days.

(21) Appl. No.: 14/234,399

(22) PCT Filed: Aug. 31, 2012

(86) PCT No.: PCT/CN2012/080845
§ 371 (c)(1),
(2), (4) Date: Jan. 23, 2014

(87) PCT Pub. No.: WO2013/063978
PCT Pub. Date: May 10, 2013

(65) Prior Publication Data
US 2014/0176899 A1      Jun. 26, 2014

(30) Foreign Application Priority Data
Oct. 31, 2011  (CN) .......................... 2011 1 0338314

(51) Int. Cl.
G02C 11/02          (2006.01)
(52) U.S. Cl.
CPC ...................................... *G02C 11/02* (2013.01)
(58) Field of Classification Search
CPC ................................ G02C 11/00; G02C 11/02
USPC ...................................................... 351/51, 52
See application file for complete search history.

(56) References Cited

U.S. PATENT DOCUMENTS 1,555,388 A * 9/1925 Schumacher ................... 351/51
6,641,262 B1 * 11/2003 Cheng ............................. 351/51

FOREIGN PATENT DOCUMENTS

| CN | 1241267 A | 1/2000 |
| CN | 101794032 A | 8/2010 |
| CN | 101983021 A | 3/2011 |
| CN | 102354060 A | 2/2012 |
| CN | 202306047 U | 7/2012 |

(Continued)

OTHER PUBLICATIONS

International Search Report for corresponding International Application No. PCT/CN2012/080845, mailed Dec. 6, 2012 (8 pages).

*Primary Examiner* — Huy K Mai
(74) *Attorney, Agent, or Firm* — Osha Liang LLP

(57) ABSTRACT

A structure of a diamond-inlaid eyeglass temple includes an eyeglass temple body (1) and an elastomer (3) set thereon. The elastomer (3) has an elastic tendency to bend inwardly and the two external sides thereof are connected, respectively, to a first holding device (4) and a second holding device (5) with a cantilever structure. A first groove (41) and a second groove (51) are provided, respectively, on the corresponding end surfaces of the first holding device (4) and the second holding device (5). A diamond (2) is clamped under the elastic force of the elastomer (3). Also provided are eyeglasses with the structure of diamond-inlaid glass temple and a diamond-inlaying method. Eyeglasses with a structure of the diamond-inlaid eyeglass temple have a high production efficiency, and the diamonds are fixed firmly and are less prone to falling out. The diamond-inlaying method features a simple process and is easy to operate.

8 Claims, 4 Drawing Sheets

(56) References Cited

FOREIGN PATENT DOCUMENTS

| | | |
|---|---|---|
| JP | 1-100512 A | 4/1989 |
| JP | 11-133362 A | 5/1999 |
| JP | 3171309 B2 | 5/2001 |
| JP | 2008-139425 A | 6/2008 |
| JP | 2000-236922 A | 9/2014 |
| WO | 2011/107410 A1 | 9/2011 |

* cited by examiner

STRUCTURE OF DIAMOND-EMBEDDED EARPIECE AND EYEGLASS AND DIAMOND-EMBEDDING METHOD THEREOF

CROSS REFERENCE TO RELATED APPLICATIONS

This is a national stage application of PCT/CN2012/080845, filed on Aug. 31, 2012, which claims the priority of Chinese Application No. 201110338314.9, filed on Oct. 31, 2011. This Application claims the benefit and priority of these prior filed applications and incorporates their disclosures by reference in their entirety.

FIELD OF THE INVENTION

The present invention relates to a set of diamond-embedded (diamond-inlaid) eyeglasses and a diamond inlaying method, in particular to a diamond-inlaid eyeglass temple structure, a set of eyeglasses, and a diamond inlaying method.

BACKGROUND OF THE INVENTION

As people's education and living standards improve and vision care is popularized, eyeglasses take an important role in people's lives. A set of eyeglasses mainly consists of a pair of lens and an eyeglass frame, wherein the eyeglass frame is mainly used to support the lens so that the eyeglasses can be worn in front of the eyes. In addition, the eyeglass frame also has beautifying and decorating effects. Therefore, diamond inlaid (i.e., diamond embedded) eyeglass frames have emerged to meet the demand for fashion. Existing diamond-inlaid eyeglass frames are manufactured by inlaying diamonds in eyeglass frames. An eyeglass frame consists of eyeglass rims and eyeglass temples (also referred to as earpieces). In diamond-embedded eyeglasses, the eyeglass temples are bored at the outer side, and diamonds are inlaid (embedded) in the bores and bonded to the eyeglass temples with glue. The diamond inlaying work is time-consuming and labor-intensive, and has a low production efficiency. In addition, the diamonds, which are bonded with glue, tend to fall off easily.

SUMMARY OF THE INVENTION

To overcome the drawbacks of diamond-inlaid eyeglass frames in the prior art (i.e., inefficiency in diamond inlaying and the tendency for the diamond to fall off), the present invention provides a type of diamond-inlaid eyeglass temple structures, a set of eyeglasses, and a type of diamond inlaying methods. In the diamond-inlaid eyeglass temple structures, the diamonds can be inlaid in a time-saving and labor-saving manner with a high production efficiency. The diamonds in these structures are firmly fixed and will not fall off easily. With the diamond inlaying methods, the process of diamond inlaying involve simple steps and are easy to operate and, therefore, can achieve high production efficiency.

Embodiment of the present invention may include: a diamond-inlaid eyeglass temple structure, comprising an eyeglass temple body and a diamond, wherein the diamond has a crown part, a girdle part, and a pavilion part. The eyeglass temple body has an elastomer, which has an inwardly-bending elastic tendency; the two ends of the elastomer are connected at the outer side with a first gripping part and a second gripping part, respectively, in a cantilevered manner. The first gripping part and second gripping part have a first slot and a second slot, respectively, on their opposite end surfaces. The first slot and second slot symmetrically grip the diamond at its girdle part, with the crown part of the diamond exposed outside of the first gripping part and second gripping part. The diamond is gripped firmly under the elastic force of the elastomer.

In some embodiments, the diamond has a bottom tip abuts the elastomer.

In some embodiments, the eyeglass temple body, the elastomer, the first gripping part, and the second gripping part may be formed in an integral structure. The contours between the elastomer and the first gripping part and between the elastomer and the second gripping part are in a broken elliptical form, equally spaced waveform, or rectangular waveform.

In some embodiments, the two sides of the first slot and second slot fit the crown part and pavilion part of the diamond, respectively.

In some embodiments, a set of eyeglasses may include the above-mentioned diamond-inlaid eyeglass temple structures, and further comprises an eyeglass rim and hinges, wherein the eyeglass rim is mounted with lens and has stud ends and a nose bridge, and the two ends of the hinges connect the eyeglass temple bodies and stud ends, respectively.

Some embodiments relate to diamond inlaying methods for the above-mentioned diamond-inlaid eyeglass temple structure. A method may comprise the following steps: (1) selecting a piece of material, producing an eyeglass temple body by wire cutting; cutting out an elastomer, a first gripping part, a second gripping part, and a first slot and a second slot; (2) bending the elastomer outwards, placing a diamond into the space between the first gripping part and the second gripping part, aligning the girdle part of the diamond with the first slot and second slot, and positioning the diamond between the first slot or second slot; (3) releasing the elastomer (i.e., stop the bending) while keeping the relative position of the diamond unchanged, so that the first gripping part and second gripping part grip the diamond firmly under the elastic force of the elastomer.

Embodiments of the present invention may have one or more of the following advantages: with the technical schemes described above, diamonds can be inlaid in the diamond-inlaid eyeglass temple structures and eyeglasses in a time-saving and labor-saving manner with high production efficiency, and the diamonds can be fixed firmly and will not fall off easily. With the diamond inlaying methods, the diamond inlaying processes involve simple steps and are easy to operate, and can achieve high production efficiency.

Figure 1:
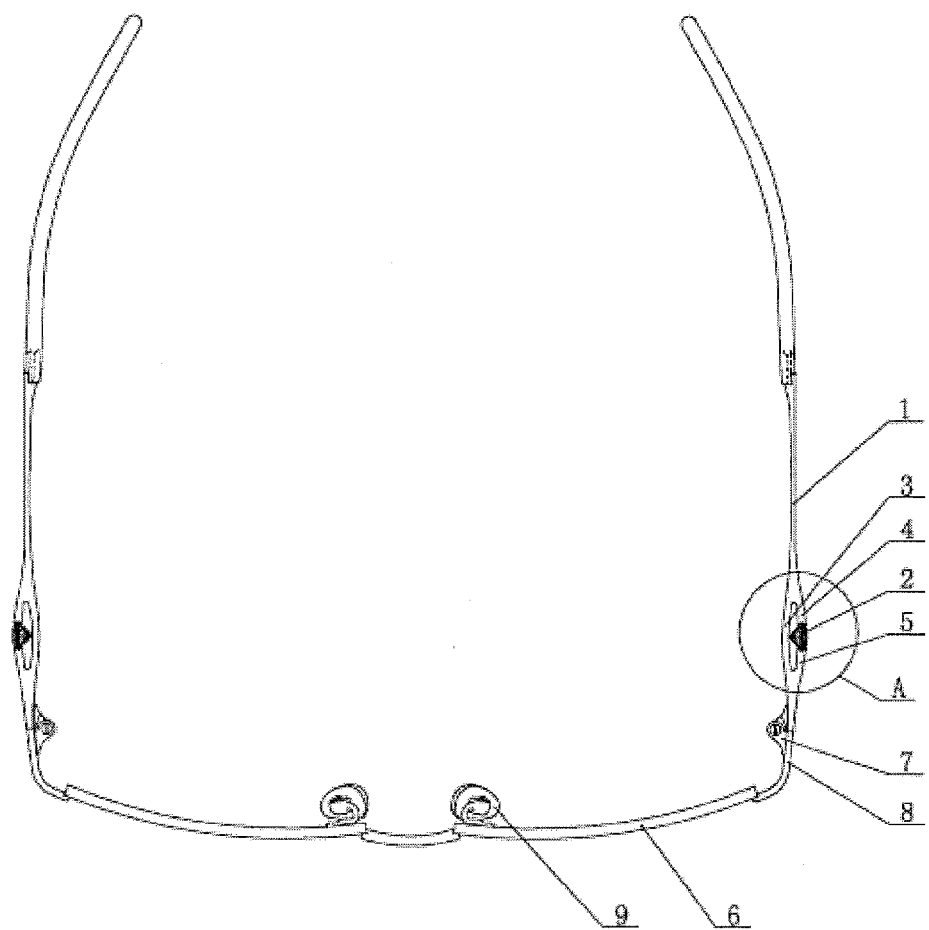
FIG. 1 is a schematic structural diagram of the present invention.

In the figures, the reference numerals are: 1—eyeglass temple body, 2—diamond, 21—crown part, 22—girdle part, 23—pavilion part, 24—culet, 3—elastomer, 4—first gripping part, 41—first slot, 5—second gripping part, 51—second slot, 6—eyeglass rim, 7—hinge, 8—temple bending, 9—nose bridge, 10—lens.

DETAILED DESCRIPTION OF THE INVENTION

Hereinafter, the present invention will be explained, with reference to the accompanying drawings.

As shown in FIG. 1 and FIGS. 2-5, a diamond-inlaid eyeglass temple structure comprises an eyeglass temple body 1 and a diamond 2, wherein the diamond 2 has a crown part 21, a girdle part 22, and a pavilion part 23. Diamond 2 may be a round diamond or square diamond. The eyeglass temple body 1 has an elastomer 3, which has an inwardly-bending elastic tendency; that is, the middle part of the elastomer 3 tends to bend towards inner side, wherein the inner side here refers to the side near the cheek, while the opposite side is outer side. The two ends of the elastomer 3 are connected at the outer side with a first gripping part 4 and a second gripping part 5, respectively, in a cantilevered manner. The first gripping part 4 and second gripping part 5 have a first slot 41 and second slot 51 on their opposite end surfaces, respectively. The first slot 41 and second slot 51 grip the girdle part 22 of the diamond 2 symmetrically, with the crown part of the diamond 2 exposed outside of the first gripping part 4 and second gripping part 5, so that the diamond 2 is gripped firmly under the elastic force of the elastomer 3. In the diamond-inlaid eyeglass temple structure, the diamond 2 can be inlaid in a time-saving and labor-saving manner with a high production efficiency, and the diamond can be fixed firmly and will not fall off easily.

Figure 3:
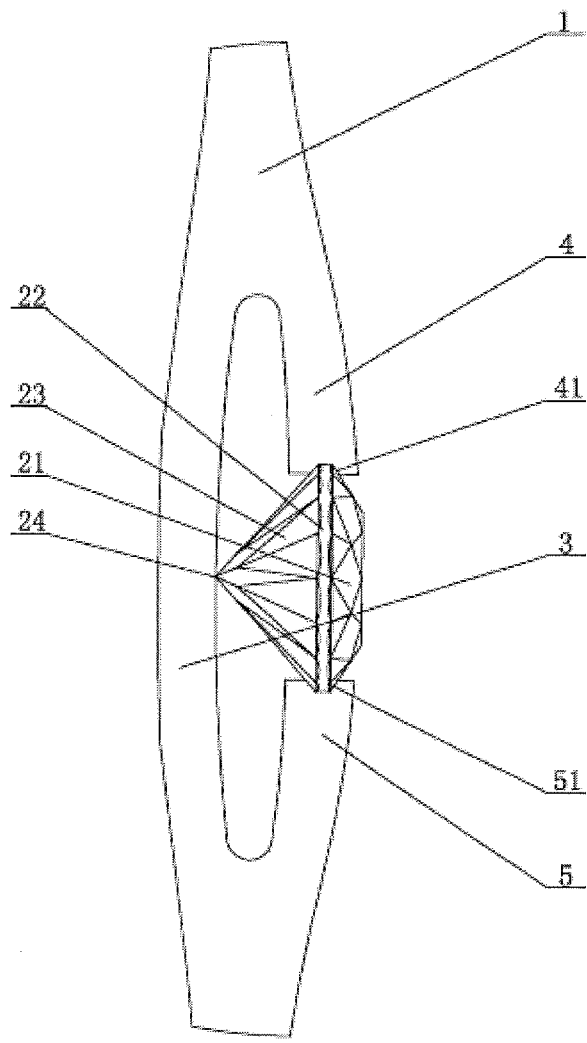
FIG. 3 is an enlarged view of part A in FIG. 1.

As shown in FIG. 3, the diamond 2 has a culet (bottom tip) 24, which props against (i.e., abuts) the elastomer 3. The elastic force of the elastomer 3 acts on the diamond 2, creating high friction force between the crown part 21 of the diamond 2 and the sides of the first slot 41 and second slot 51. Therefore, the diamond 2 will not move and will not fall off easily.

As shown in FIGS. 1, 2, 3, 4, and 5, the eyeglass temple body 1, elastomer 3, first gripping part 4, and second gripping part 5 are formed in an integral structure, and the contour between the elastomer 3 and the first gripping part 4 and between the elastomer 3 and the second gripping part 5 is in a broken elliptical form, equally spaced waveform, or rectangular waveform. The inner side of the elastomer 3 smoothly transits to the eyeglass temple body 1; thus, the strength at the elastomer 3 is ensured, and the eyeglasses can be worn comfortably and have esthetic appearance. The contour between the elastomer 3 and the first gripping part 4 and the elastomer 3 and the second gripping part 5 is not limited to the above-mentioned forms, which is to say, the contour can be in any form, as long as enough strength of the first gripping part 4 and second gripping part 5 can be ensured so that the first gripping part 4 and second gripping part 5 can grip the diamond 2 firmly under the elastic force of the elastomer 3.

Figure 4:
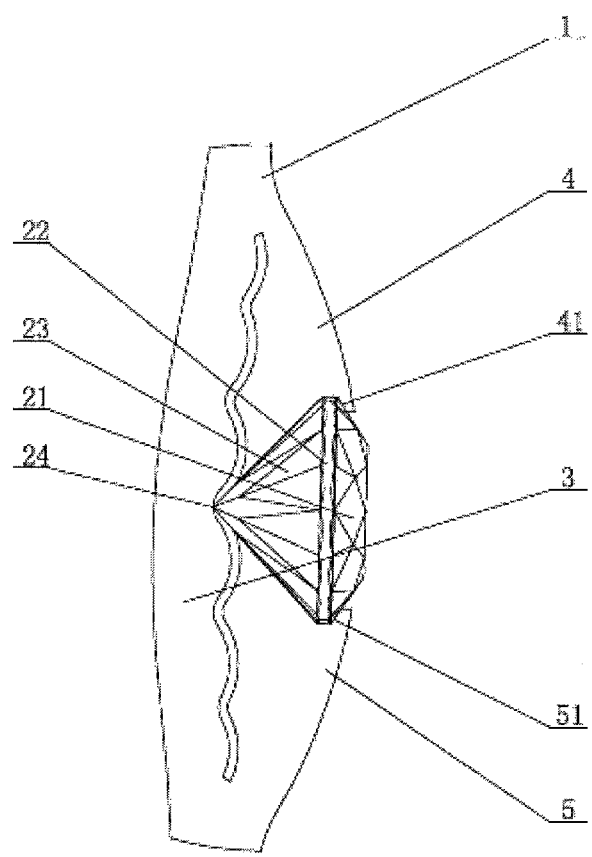
FIG. 4 is a schematic diagram illustrating a second embodiment of the mounting structure of diamond 2.
Figure 5:
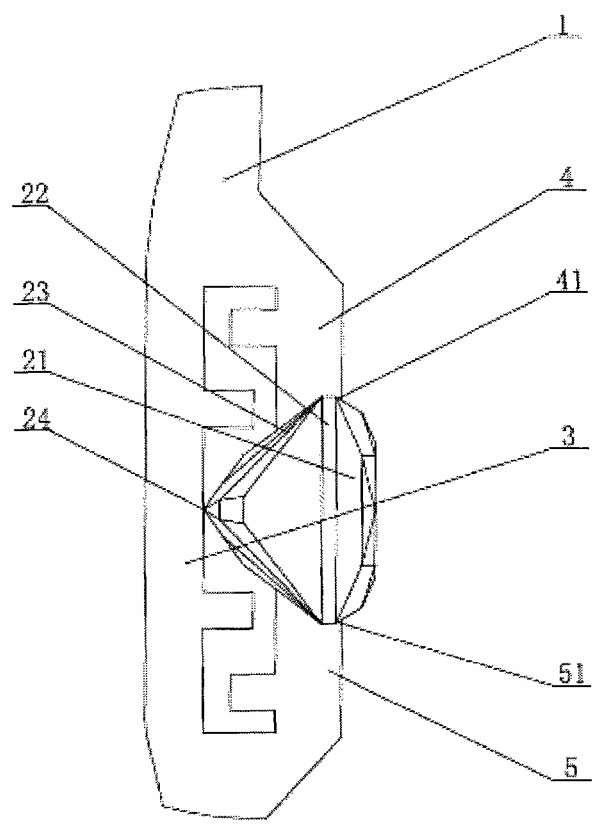
FIG. 5 is a schematic diagram illustrating a third embodiment of the mounting structure of diamond 2.

As shown in FIGS. 3, 4, and 5, the two sides of the first slot 41 and second slot 51 fit the crown part 21 and pavilion part 23 of the diamond 2, respectively. Thus, additional contact points between the first gripping part 4 and second gripping part 5 and the diamond 2 are obtained, so that the diamond 2 is kept stably and will not get loose.

Figure 2:
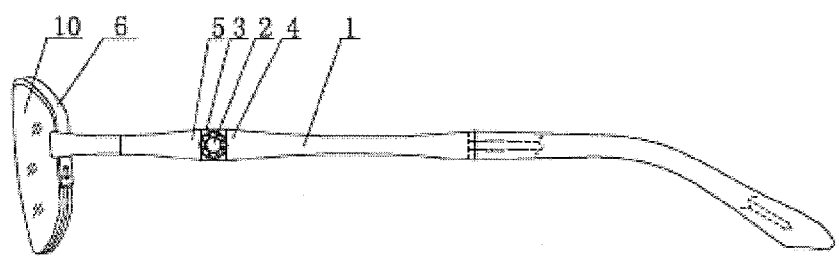
FIG. 2 is a right side view of the structure shown in FIG. 1.

A set of eyeglasses comprising the above-mentioned diamond-inlaid eyeglass temple structures, as shown in FIG. 1 and FIG. 2, further comprises eyeglass rims 6 and hinges 7, wherein the eyeglass rims 6 are mounted with lens 10 and has stud ends 8 and a nose bridge 9, and the eyeglass temple bodies 1 and stud ends 8 are fixed to the two ends of the hinges 7, respectively. In the eyeglasses with diamond-inlaid eyeglass temples, the diamonds 2 can be inlaid in a time-saving and labor-saving manner with a high production efficiency, and the diamond can be fixed firmly and will not fall off easily.

A diamond inlaying method for the above-mentioned diamond-inlaid eyeglass temple structure may comprise the following steps: (1) selecting a piece of material (as an example, a 1.2 mm stainless steel plate may be used); selecting round diamonds with 5.0 mm girdle diameter or square diamonds in 5.0 mm×5.0 mm dimensions; producing an eyeglass temple body 1 by wire cutting; separating (cutting out) an elastomer 3, a first gripping part 4, a second gripping part 5, and a first slot 41 and a second slot 51; (2) bending the elastomer 3 outwards to widen the spacing between the first gripping part 4 and the second gripping part 5, placing a diamond 2 into the space between the first gripping part 4 and the second gripping part 5, aligning the girdle part 22 of the diamond 2 with the first slot 41 and second slot 51, and positioning the diamond between the first slot 41 or second slot 51; (3) releasing (the bending of) the elastomer 3 while keeping the relative position of the diamond 2 unchanged, so that the first gripping part 41 and the second gripping part 51 grip the diamond 2 firmly under the elastic force of the elastomer 3. With such a diamond inlaying method, the diamond inlaying processes involve simple steps and are easy to operate, and can achieve a high production efficiency.

What is claimed is:

1. A diamond-inlaid eyeglass temple structure, comprising an eyeglass temple body and a diamond, wherein the diamond has a crown part, a girdle part, and a pavilion part, the eyeglass temple body has an elastomer, which has an inwardly-bending elastic tendency, and two ends of the elastomer are connected at an outer side with a first gripping part and a second gripping part, respectively, in a cantilevered manner, the first gripping part and the second gripping part have a first slot and a second slot, respectively, on their opposite end surfaces, the first slot and second slot grip the diamond at the girdle part symmetrically, with the crown part of the diamond exposed outside the first gripping part and the second gripping part, and the diamond is thinly gripped under an elastic force of the elastomer.

2. The diamond-inlaid eyeglass temple structure according to claim 1, wherein the diamond has a culet, which abuts the elastomer.

3. The diamond-inlaid eyeglass temple structure according to claim 2, wherein the two sides of the first slot and the second slot fit the crown part and the pavilion part of the diamond, respectively.

4. The diamond-inlaid eyeglass temple structure according to claim 1, wherein the eyeglass temple body, elastomer, the first gripping part, and the second gripping part are formed in an integral structure, and a contour between the elastomer and the first gripping part and a contour between the elastomer and the second gripping part having a profile of a broken elliptical form, an equally spaced waveform, or a rectangular waveform.

5. The diamond-inlaid eyeglass temple structure according to claim 4, wherein the two sides of the first slot and the second slot fit the crown part and the pavilion part of the diamond, respectively.

6. The diamond-inlaid eyeglass temple structure according to claim 1, wherein the two sides of the first slot and the second slot fit the crown part and the pavilion part of the diamond, respectively.

7. A set of eyeglasses comprising the diamond-inlaid eyeglass temple structures as set forth in claim 1, further comprising an eyeglass rim and hinges, wherein the eyeglass rim is mounted with lens and has stud ends and a nose bridge, and the eyeglass temple bodies and stud ends are fixed to the two ends of the hinges, respectively.

8. A diamond inlaying method for the diamond-inlaid eyeglass temple structure as set forth in claim 1, comprising the following steps:
- Step 1: selecting a piece of a material, producing an eyeglass temple body by wire cutting, cutting out an elastomer, a first gripping part, a second gripping part, a first slot, and a second slot;
- Step 2: bending the elastomer outwards, placing a diamond into a space between the first gripping part and the second gripping part, aligning a girdle part of the diamond with the first slot and the second slot, and positioning the diamond between the first slot and the second slot; and
- Step 3: loosening the elastomer while keeping a position of the diamond unchanged, so that the first gripping part and the second gripping part grip the diamond firmly under an elastic force of the elastomer.

* * * * *